No. 740,280. PATENTED SEPT. 29, 1903.
T. IKEMORI.
ILLUMINATED MAP.
APPLICATION FILED JULY 8, 1903.
NO MODEL.
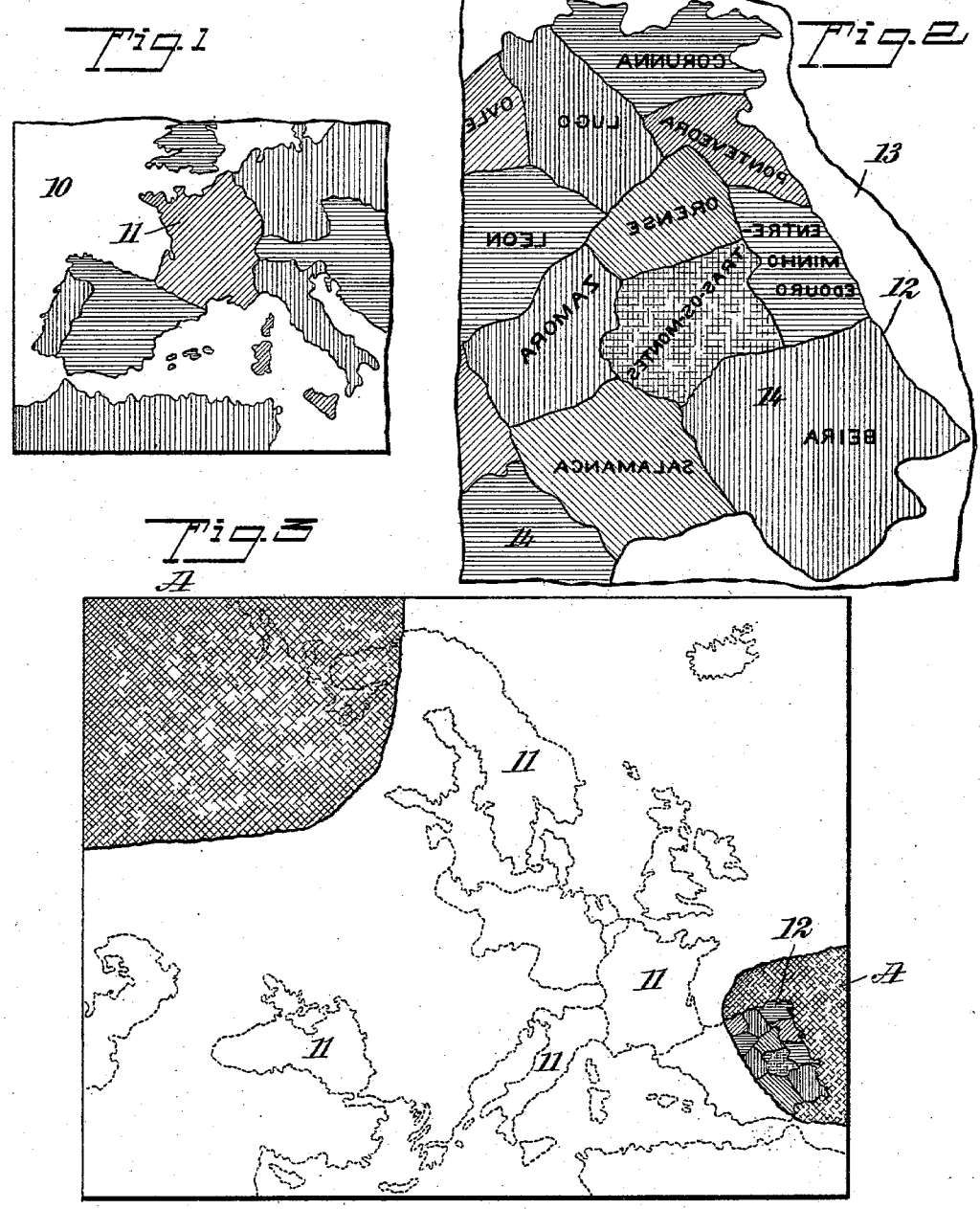
WITNESSES:
INVENTOR
Tetsutaro Ikemori
BY
ATTORNEYS.

No. 740,280. Patented September 29, 1903.

UNITED STATES PATENT OFFICE.

TETSUTARO IKEMORI, OF NEW YORK, N. Y.

ILLUMINATED MAP.

SPECIFICATION forming part of Letters Patent No. 740,280, dated September 29, 1903.

Application filed July 8, 1903. Serial No. 164,698. (No model.)

*To all whom it may concern:*

Be it known that I, TETSUTARO IKEMORI, a subject of the Emperor of Japan, and a resident of the city of New York, borough of Manhattan, in the county and State of New York, have invented a new and Improved Illuminated Map, of which the following is a full, clear, and exact description.

The purpose of my invention is to provide a map capable of being illuminated, which may be profitably used in a class-room to instruct pupils in geography or history, and to so construct the map that it will consist of a body of transparent or semitransparent material, capable of being illuminated, upon the front face of which body the various countries are produced in outline only and in fixed colors—for example, oil-colors—the subdivisions of the various countries and their names, together with the names of the principal cities, rivers, &c., if desired, being produced upon the back of the body, also in fixed colors, the subdivisions of the several countries being exactly back of and within the outlines of the countries to which they belong and which appear at the front of the map.

In the further construction of the map the back is given a complete coat of white in oil. Under ordinary circumstances, therefore, the back appears plain, the outlines of the countries appearing at the front of the map; but the subdivisions, their names, and other detail information will remain hidden until an electric or other light is moved over the back of the map, whereupon the hitherto-concealed matter will be visible from the front wherever such matter is within the rays of light, and any route, destination, mountain, or river produced in opaque water-color upon the white back of the map will also show through at the front, thus enabling a teacher to make plain given routes and locations of mountains or rivers, &c., or the special geography of a country or a section of country where an unusual or noteworthy event may have occurred.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of a portion of the map. Fig. 2 is a rear elevation of a portion of the map, showing the subdivisions of a country produced thereon as they would appear upon the white background, the body of the map having been removed. Fig. 3 is a rear elevation of a portion of the map, parts of the white back coating being broken away and a portion of the body to disclose the body and a part of the normally concealed subdivisions of countries, the general outline of the countries appearing at the front being shown by dotted lines; and Fig. 4 is a vertical section through a part of the map.

A represents the body of the map, which is constructed of a material capable of being illuminated—as, for example, a transparent or a semitransparent material, such as tracing-linen, plain linen, cotton, or the like. The front face of the body A is provided with a coating 10, of oil-color, and on this front body color 10 the various countries 11 are produced in outline. These countries may be tinted within the outlines or not, as may be desired. Next the outlines of the countries are duplicated at the back of the body A, and in this duplication 12 the subdivisions 14 of the several countries are shown, together with the names of such subdivisions and the names of the principal cities, rivers, mountains, and the like, if desired. These subdivisions may be tinted or colored as fancy may dictate, so as to readily distinguish one from the other, it being understood that the subdivisions of each country appearing at the back of the body are immediately at the rear of the outline representations of such country at the front and within said outline of said country. Next, the back of the body A is given a coat 13 of white color. All of the parts described, together with the front and rear coatings for the body, are produced in an oil-color, so that the front and the back of the map may be washed off whenever desired.

In connection with the map an electric or other light is employed. Normally all that is visible to the observer is the plain back of the map and the countries in outline at the front; but during the progress of a lecture, for example, as the light is moved at the back of the map the subdivisions of the country, with the information thereon, will be rendered visible at the front of the map within the outlines of the country described.

If desired, the instructor may by the use of an opaque water-color trace on the back of the map on the white ground color 13 a given route—leading from city to city, for example, and across oceans or seas, or rivers, or over mountains—to illustrate a line of travel, for instance. When such delineation is made and a light is placed at the back of the map, such delineation will be rendered visible at the front of the map, together with the subdivisions of the country or countries back of which such delineations are produced.

If desired, the course of travel may be indicated in water-color on the front of the map, and various printing devices may be employed to produce the representation in water-color of mountains, valleys, volcanoes, &c., on the front or back of the map, and after the completion of the lecture all of the water-color prints may be readily washed off, leaving the map clean and ready to be again used to demonstrate another subject.

Having thus described my invention, I claim as new and desire to secure by Letters Patent—

1. A map, comprising a body capable of being illuminated, the front of the map having countries produced thereon in outline, and the back of the map having duplicates of the countries produced thereon, and subdivisions of the countries, for the purpose described.

2. An illuminated map, consisting of a body of transparent material or semitransparent material, having countries in outline produced upon its front face and corresponding countries produced upon its rear face, the countries at the rear face showing subdivisions and giving other information, the back of the map being provided with a coating of white which conceals the subdivided representation of countries, whereby to make such subdivisions visible only when the rays of a light are made to pass through the map, as set forth.

3. An illuminated map, consisting of a body of transparent or semitransparent material, having its front provided with a coating of oil-color, and countries in outline shown on said coating, the back of the body having corresponding countries produced directly thereon, the countries at the back showing the subdivisions of the countries, the said body at the back being further provided with a coating of white, which white coating extends over the representations of the subdivisions of the countries, as and for the purpose set forth.

In testimony whereof I have signed my name to this specification in the presence of two subscribing witnesses.

TETSUTARO IKEMORI.

Witnesses:
J. FRED. ACKER,
JNO. M. RITTER.